(12) United States Patent  (10) Patent No.: US 7,558,110 B2
Mizushima et al.  (45) Date of Patent: Jul. 7, 2009

(54) IC MODULE AND CELLULAR PHONE

(75) Inventors: Nagamasa Mizushima, Machida (JP);
Kunihiro Katayama, Chigasaki (JP);
Masaharu Ukeda, Yokohama (JP);
Yoshinori Mochizuki, Yokohama (JP)

(73) Assignee: Renesas Technology Corp., Tokyo (JP)

( * ) Notice: Subject to any disclaimer, the term of this patent is extended or adjusted under 35 U.S.C. 154(b) by 255 days.

(21) Appl. No.: 11/740,961

(22) Filed: Apr. 27, 2007

(65) Prior Publication Data
US 2007/0253251 A1 Nov. 1, 2007

(30) Foreign Application Priority Data
Apr. 28, 2006 (JP) .............................. 2006-124593

(51) Int. Cl.
*G11C 16/04* (2006.01)

(52) U.S. Cl. ............................ 365/185.04; 365/185.01; 340/5.6; 361/728; 361/737; 705/41; 398/115; 235/462.46; 235/492; 235/380

(58) Field of Classification Search ............ 365/185.04, 365/185.01; 340/5.6; 361/728, 737; 705/41; 398/115; 235/462.46, 492, 380
See application file for complete search history.

(56) References Cited

U.S. PATENT DOCUMENTS 6,400,965 B1 * 6/2002 Phillips et al. .............. 455/558
6,669,487 B1 * 12/2003 Ishihara et al. .............. 439/60
2002/0024844 A1 * 2/2002 Saeki ..................... 365/185.22
2003/0006280 A1 * 1/2003 Seita et al. .................. 235/380
2003/0112972 A1 * 6/2003 Hattick et al. ................ 380/46
2005/0224589 A1 * 10/2005 Park et al. ................... 235/492
2005/0252978 A1 * 11/2005 Nishizawa et al. .......... 235/492
2006/0091200 A1 * 5/2006 Lai et al. .................... 235/380

FOREIGN PATENT DOCUMENTS

JP          2005-293444          10/2005

\* cited by examiner

*Primary Examiner*—Pho M. Luu
*Assistant Examiner*—Eric Wendler
(74) *Attorney, Agent, or Firm*—Antonelli, Terry, Stout & Kraus, LLP.

(57) ABSTRACT

In a SIM card having a flash memory chip, a memory controller chip, and contact/contactless card interfaces, the memory controller chip has a function of executing user authentication of a host equipment, executes processing of data transmitted through the contactless IC card interface (executing reading or writing of data to the flash memory chip) using power supplied from the host equipment to the contact IC card interface, and executes initialization of the flash memory chip between activation of the host equipment and completion of user authentication instructed by the host equipment.

28 Claims, 9 Drawing Sheets

IC MODULE AND CELLULAR PHONE

CROSS-REFERENCE TO RELATED APPLICATION

The present application claims priority from Japanese patent application No. JP 2006-124593 filed on Apr. 28, 2006, the content of which is hereby incorporated by reference into this application.

TECHNICAL FIELD OF THE INVENTION

The present invention relates to a storage apparatus having a contactless communication function, a host equipment in which the storage apparatus can be inserted, and a host equipment including the storage apparatus, and in particular to a technique effective in application such an IC card as a SIM (Subscriber Identity Module) having a flash memory chip, a memory controller chip, and an RF (Radio Frequency) communication controller chip, a cellular phone loaded with the IC card, and the like.

BACKGROUND OF THE INVENTION

For example, as one example of a storage device having a contactless communication function, Japanese Patent Application Laid-Open Publication No. 2005-293444 (Patent Document 1) describes a memory card having a flash memory chip, a memory controller chip, a contact IC card chip, and a contactless IC card chip.

Generally, power required for activation of a contactless IC card chip is supplied from electric field generated by an exclusive reading device via a coil-type antenna attached to a contactless IC card interface. Therefore, the contactless IC card is used under an environment of a considerably unstable power source. And, the most expectable application of the contactless IC card is an electronic ticket, where read and write of data must be executed within a short time such as several hundred milliseconds when a user having the ticket passes through an entrance gate.

On the other hand, the flash memory is a non-volatile semiconductor memory that originally has more defective memory cells than other semiconductor memories. Therefore, it is necessary to execute an initialization operation, such as reading a table recording addresses of defective memory cells from a portion of normal memory cells before conducting data read or write, to avoid using the defective memory cells. Further, since it is necessary to erase a memory block including a plurality of memory cells before data is programmed in the flash memory, if a power source is cut off during data programming, recorded content may be destroyed with a large scale.

SUMMARY OF THE INVENTION

Now, based upon the above-mentioned background art, such a case is conceivable that it is difficult and dangerous for the memory card described in Patent Document 1 to execute read and write of data to the flash memory in response to a command received via the contactless IC card interface. This is because, since the contactless IC card chip in the memory card described in Patent Document 1 operates for a short time under an environment of a considerably unstable power source, a time margin for executing an initialization operation required to use the flash memory is reduced and a possibility that much data is destroyed due to sudden stop of power supplying is high.

In view of these circumstances, an object of the present invention is to provide a technique for executing read and write of data to a flash memory easily and safely in response to a command received through a contactless IC card interface in an IC card such as a SIM card, a cellular phone loaded with the IC card, or the like.

The present invention provides an IC card including a flash memory chip, a memory controller chip having a control function to the flash memory chip, a contact IC card interface, and a contactless IC card interface, wherein the memory controller chip has an authentication function of a host equipment user, and reads or writes data transmitted through the contactless IC card interface from or into the flash memory utilizing power supplied from the host equipment to the contact IC card interface, and the memory controller chip executes initialization of the flash memory chip upon power supplying of the host equipment to the contact IC interface or upon access of the host equipment to the contact IC interface to instruct the authentication function.

The present invention provides the IC card wherein, when power is supplied to the contact IC card interface, the memory controller chip having a flash memory control function executes initialization of the flash memory chip.

The present invention provides the IC card wherein, when a reset signal is inputted into the contact IC card interface, the memory controller chip having a flash memory control function executes initialization of the flash memory chip.

The present invention provides the IC card wherein, when a command for selecting a host equipment service subscriber authenticating function is inputted into the contact IC card interface, the memory controller chip having a flash memory control function executes initialization of the flash memory chip.

The present invention provides the IC card wherein, when a command for authenticating a host equipment service subscriber is inputted into the contact IC card interface, the memory controller chip having a flash memory control function executes initialization of the flash memory chip.

And, the present invention provides the IC card wherein, an execution result of the initialization of the flash memory chip is saved in a non-volatile memory inside the memory controller chip and when the initialization is executed again, access to the flash memory chip is bypassed by referring to the execution result.

Further, the present invention provides a cellular phone including an IC card having such a feature as described above, an antenna, and a power source, wherein the memory controller chip has an authentication function of a cellular phone user, and the memory controller chip executes processing of data transmitted from the antenna through the contactless IC card interface utilizing power supplied from the power source of the cellular phone to the contact IC card interface.

According to the present invention, in an IC card such as a SIM card, a cellular phone loaded with the IC card, or the like, such an effect can be achieved that read and write of data in a flash memory in response to a command received through a contactless IC card interface can be performed easily and safely.

BRIEF DESCRIPTIONS OF THE DRAWINGS

DESCRIPTIONS OF THE PREFERRED EMBODIMENTS

Embodiments of the present invention will be explained below in detail with reference to the drawings. In all figures for explaining the embodiments, same members are in principle attached with same reference symbols and explanation thereof is omitted.

First Embodiment

A first embodiment of the present invention will be explained below with reference to FIG. 1 to FIG. 4.

A SIM card is an IC card used in a cellular phone of GSM (Global System for Mobile Communication) or a W-CDMA (Wideband Code Division Multiple Access) or the like. The SIM card is attached with a unique number called "IMSI (International Mobile Subscriber Identity), and by connecting the SIM card and a phone number, a cellular phone service subscriber can perform communication through a cellular phone. By loading and unloading the SIM card, the phone number can be transferred to another cellular phone or one cellular phone can be used with switching among a plurality of phone numbers. An ordinary SIM card includes a non-volatile memory with about 64K bytes, and it can save about 50 phone numbers of communication partners. The SIM card is generally lent from a telecommunication corporation or a carrier (a communication company) and it must be returned to them at the cancellation.

Figure 1:
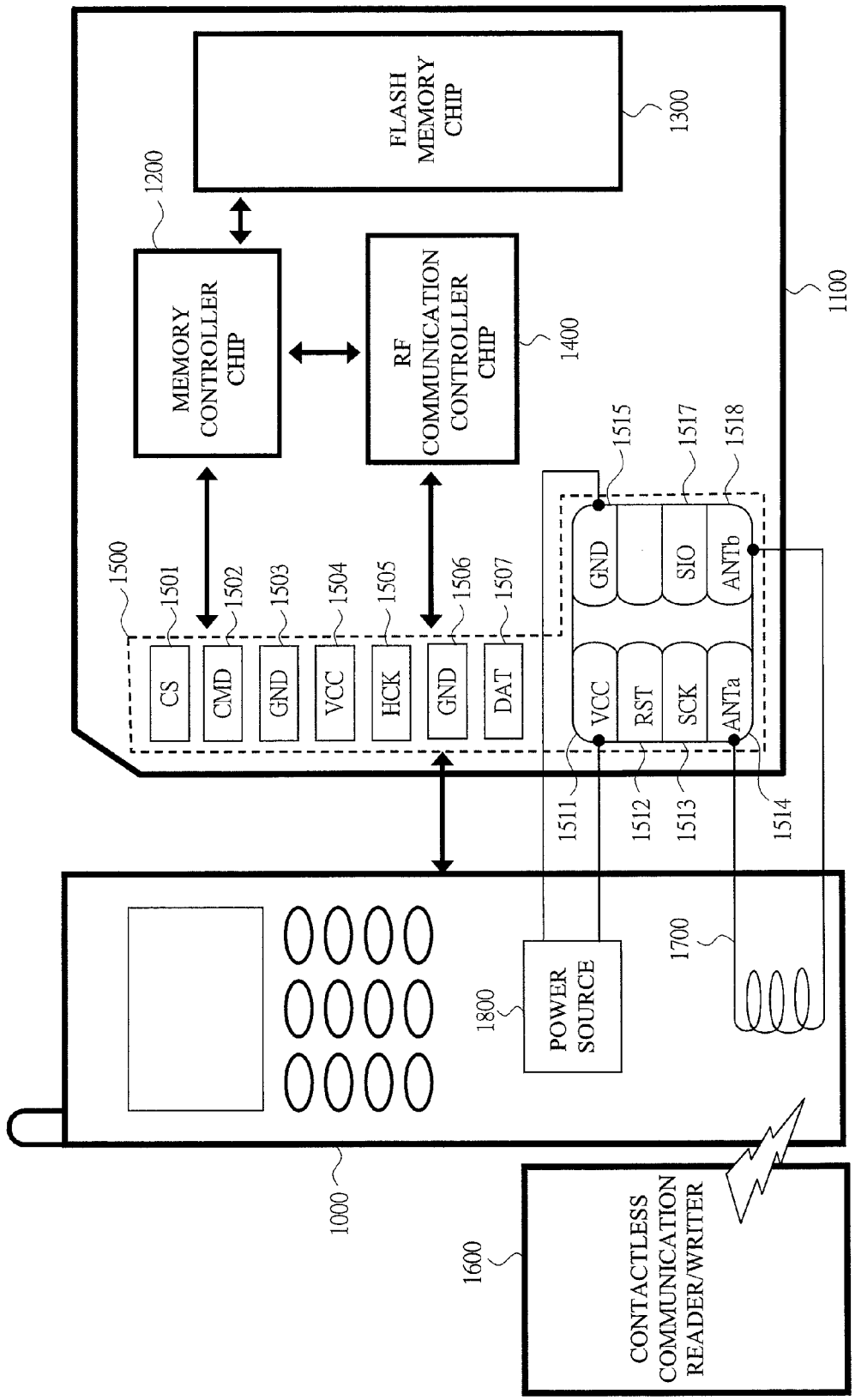
FIG. 1 is a diagram showing an internal configuration of a SIM card and a whole system including the SIM card in a first embodiment of the present invention.

FIG. 1 represents an internal configuration of a SIM card 1100 and a whole system including the SIM card 1100 in a first embodiment of the present invention simply.

The SIM card 1100 has a memory card function conforming to a MultiMediaCard specification, a function for authenticating a cellular phone service subscriber according to a contact IC card command inputted through a transmission system conforming to ISO/IEC7816-3 Standard, and a function for performing input/output of secret data such as an electronic money, an electronic ticket, or the like according to a contactless IC card command inputted through a transmission system conforming to ISO/IEC14443 Standard.

The SIM card 1100 includes a flash memory chip 1300, a memory controller chip 1200, an RF communication controller chip 1400, and an external terminal group 1500. The memory controller chips 1200 can be plural, and a capacity of non-volatile memory that can be utilized in the SIM card 1100 is increased according to increase of the number of memory controller chips 1200. The flash memory chip 1300 is a non-volatile semiconductor memory. The memory controller chip 1200 is a microcomputer.

The external terminal group 1500 includes seven memory card external terminals conforming to MultiMediaCard specification, and eight contact IC card external terminals conforming to ISO/IEC7816-2. An external host equipment such as a digital camera accesses the SIM card 1100 via the memory card external terminal to cause the SIM card 1100 to perform the memory card function. A cellular phone 1000 accesses the SIM card 1100 via the contact IC card external terminal to cause the SIM card 1100 to perform the subscriber authentication function.

The memory card external terminals include a CS terminal 1501, a CMD terminal 1502, GND terminals 1503 and 1506, a VCC terminal 1504, an HCK terminal 1505, and a DAT terminal 1507. The external host equipment supplies power to the SIM card 1100 using the VCC terminal 1504, and the GND terminals 1503 and 1504. The CS terminal 1501 is a terminal for inputting a signal for selecting a card that the external host equipment is going to access. The CMD terminal 1502 is a terminal through which the external host equipment inputs a memory card command conforming to the MultiMediaCard specification. The DAT terminal 1507 is a terminal for performing inputting and outputting of data to be transmitted by a memory card command. The HCK terminal 1505 is a terminal for inputting a synchronization clock used for transmission of a memory card command or data.

The contact IC card external terminals include a VCC terminal 1511, an RST terminal 1512, an SCK terminal 1513, an ANTa terminal 1514, a GND terminal 1515, an SIO terminal 1517, and an ANTb terminal 1518. The cellular phone 1000 supplies power from a power source 1800 built in the cellular phone 1000 to the SIM card 1100 using the VCC terminal 1511 and the GND terminal 1515. The power is utilized not only for the contact IC card function such as subscriber authentication but also for the contactless IC card function such as an electronic ticket. The RST terminal 1512 is a terminal through which the cellular phone 1000 inputs a reset signal for causing the SIM card 1100 to execute reset processing conforming to ISO/IEC7816-3. The SIO terminal 1517 is a terminal through which the cellular phone 1000 inputs and outputs a contact IC card command and a response to the SIM card 1100 through a transmission system conforming to ISO/IEC7816-3. The SCK terminal 1513 is a terminal for inputting a synchronization clock used for transmission of a contact IC card command and a response. The ANTa terminal 1514 and the ANTb terminal 1518 are located at the same positions as two terminals reserved in ISO/IEC7816-2 Standard, and they are terminals connected to a coil type antenna 1700 built in the cellular phone 1000 to input and output contactless IC card command and data. A contactless communication reader/rewriter 1600 can input secret data such as an electronic ticket to the SIM card 1100 via the coil type antenna 1700 and can output the same from the SIM card 1100. For example, the contactless communication reader/writer 1600 is incorporated into an entrance and exit gate apparatus in public facilities.

The flash memory chip 1300 is a memory chip with a large capacity (for example, 128 MB) utilizing a non-volatile semiconductor memory as a storage medium. The memory controller chip 1200 sections a memory region of the flash memory chip 1300 into a plurality of regions such as a file data region, a spare region, and a system region based upon a physical address range, and allocates them to different applications respectively. The file data region occupies almost all of the whole memory region, and it is a region for storing file data used for the memory card function, the contact IC card function, and the contactless IC card function. The spare region is a region including an alternative sector or a multiplexing sector. If a defective sector is included in the file data region, the data thereof is stored in the alternative sector. A table representing a correspondence relationship between a defective sector and an alternative sector corresponding thereto is also present in the spare region. Data in an erase unit block including a sector to be written are collectively saved in the multiplexing sector to prevent data in sectors except for a sector to be written from lost caused by interruption of power supply. Information representing an address of a usable multiplexing sector also exists in the spare region. The system region is a region for storing characteristic information (a table on which a capacity or attribute of a memory card and an address of a sector write-protected has been recorded, or the like) used for the memory card function and data (preferably random values) for verifying validation of the flash memory chip 1300.

The memory controller chip 1200 is connected to the external terminal group 1500, and through the external terminal group 1500, a memory card command from the external host equipment and a contact IC card command from the cellular phone 1000 can be received. The memory controller chip 1200 is connected to one or plural flash memory chips 1300 to control the flash memory chip(s) 1300.

The RF communication controller chip 1400 is connected to the ANTa terminal 1514 and the ANTb terminal 1518 in the external terminal group 1500, and can receive a contactless IC card command from the contactless communication reader/writer 1600 and can transmit a contactless IC card response to the contactless communication reader/writer 1600 through the ANTa terminal 1514 and the ANTb terminal 1518. And, the RF communication controller chip 1400 is also connected to the memory controller chip 1200 and has a function of conducting mutual conversion between an analog signal of a transmission system conforming to ISO/IEC14443 Standard and a digital signal that can be handled by the memory controller chip 1200 to perform transmission and reception of the digital signal with the memory controller chip 1200.

Figure 2:
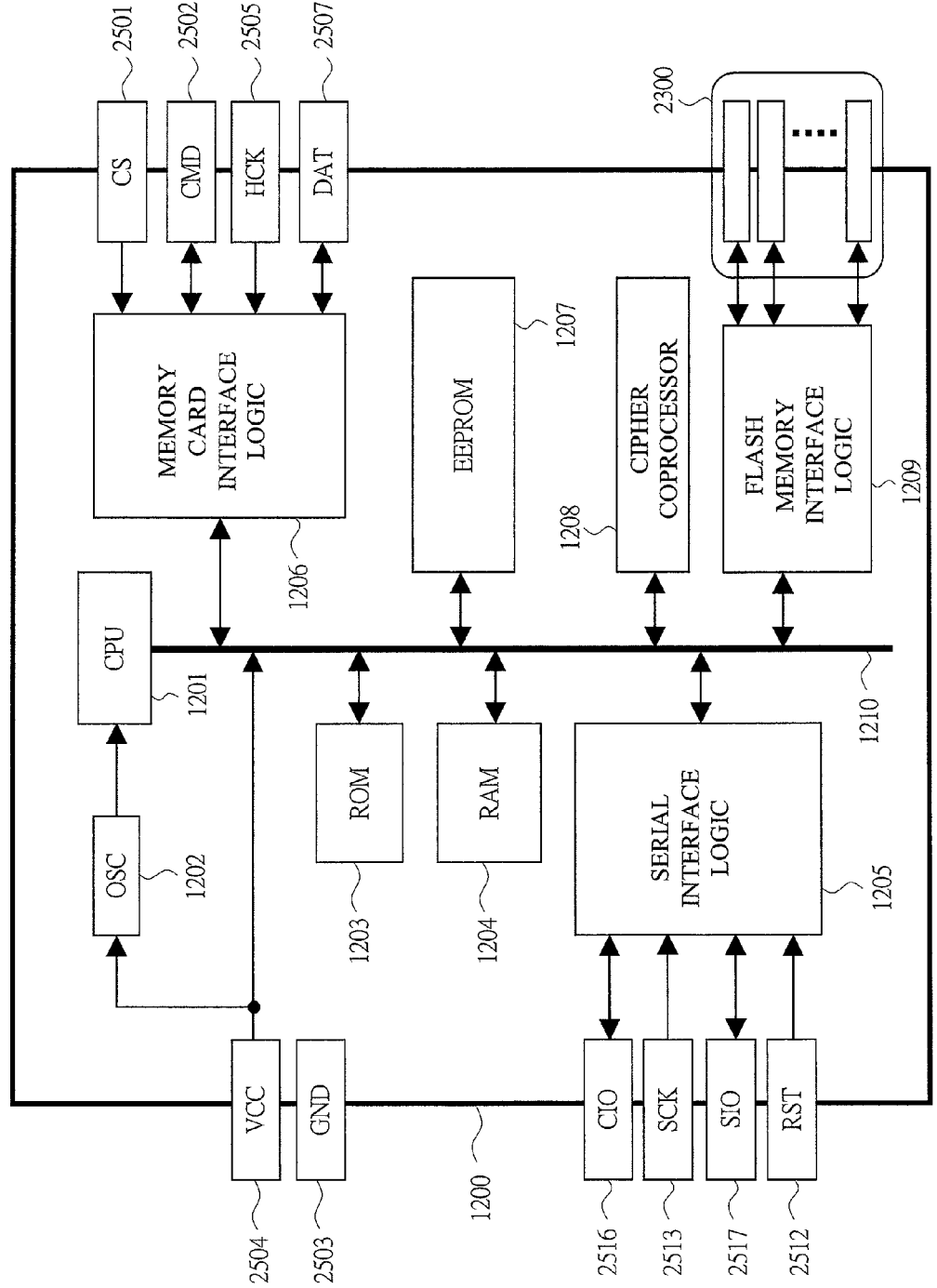
FIG. 2 is a diagram showing an internal configuration of a memory controller chip in the first embodiment of the present invention.

FIG. 2 is a diagram showing an internal configuration of the memory controller chip 1200 shown in FIG. 1.

The memory controller chip 1200 includes a CS terminal 2501 connected to the CS terminal 1501, a CMD terminal 2502 connected to the CMD terminal 1502, a GND terminal 2503 connected to the GND terminals 1515, 1503 and 1506, a VCC terminal 2504 connected to the VCC terminals 1511 and 1504, an HCK terminal 2505 connected to the HCK terminal 1505, a DAT terminal 2507 connected to the DAT terminal 1507, an RST terminal 2512 connected to the RST terminal 1512, an SCK terminal 2513 connected to the SCK terminal 1513, and an SIO terminal 2517 connected to the SIO terminal 1517. Furthermore, the memory controller chip 1200 includes a flash memory I/F terminal group 2300 for connection to the flash memory chip 1300 and a CIO terminal 2516 for connection to the RF communication controller chip 1400. The memory controller chip 1200 is activated by power supplied via the VCC terminal 1511 (or 1504) and the GND terminal 1515 (or 1503 or 1506).

The memory controller chip 1200 includes a CPU (microcomputer) 1201 for executing various arithmetic operations and an OSC 1202 that is a clock generator. Furthermore, the memory controller chip 1200 includes a ROM (Read Only Memory) 1203 storing fixed data (including programs) therein, a RAM (Random Access Memory) 1204 storing volatile data therein, a serial interface logic 1205 for performing transmission and reception of data through the contact IC card external terminal, a memory card interface logic 1206 for performing transmission and reception of data through the memory card external terminal, an EEPROM (Electrically Erasable Programmable ROM) 1207 storing non-volatile data therein, a cipher coprocessor 1208 that can execute processings such as residue multiplication or symmetric-key cryptography or generation of random numbers at a speed higher than the CPU 1201, and a flash memory interface logic 1209 for performing transmission and reception of data with the flash memory chip 1300, and these units 1203 to 1209 are activated by power supplied from the VCC terminal 2504 and they are connected to the CPU 1201 via a bus 1210.

The OSC 1202 generates drive clocks for the CPU 1201 by power supplied from the VCC terminal 2504.

The serial interface logic 1205 is connected to the SCK terminal 2513, the SIO terminal 2517, and the RST terminal 2512 and can perform serial communication processing (conforming to ISO/IEC 7816-3 Standard) with the cellular phone 1000. Furthermore, the serial interface logic 1205 is connected to the CIO terminal 2516 and can perform serial communication processing with the RF communication controller chip 1400.

The memory card interface logic 1206 is connected to the CS terminal 2501, the CMD terminal 2502, the HCK terminal 2505, and the DAT terminal 2507, and can perform a memory card command communication processing (conforming to MultiMediaCard specification) with the external host equipment.

The flash memory interface logic 1209 is connected to the flash memory I/F terminal group 2300 composed of a plurality of terminals, and control the flash memory chip 1300 through the flash memory I/F terminal group 2300 to read data from the flash memory chip 1300 and write data to the flash memory chip 1300.

The CPU 1201 executes authentication processing of a subscriber according to a program stored in the ROM 1203 or the EEPROM 1207 in response to a contact IC card command from the cellular phone 1000. The cipher coprocessor 1208 executes cryptography processing required for the authentication processing of a subscriber.

The CPU 1201 executes processings such as read, write, or erase specified in MultiMediaCard specification according to a program stored in the ROM 1203 or the EEPROM 1207 in response to a memory card command from the external host equipment.

The CPU 1201 manages the flash memory chip 1300 so as not to use a congenitally defective sector or a posteriori defect sector, when the CPU 1201 reads data from the flash memory 1300 or writes data to the flash memory chip 1300, and to prevent unrelated stored data from lost caused by power supply interruption during data writing. As the managing means, the CPU 1201 must execute some initializations whenever power is supplied to the SIM card 1100. The initializations are executed before data is read from the flash memory chip 1300 or data is written in the flash memory chip 1300.

Specific operation of initializations of the flash memory chip 1300 include (1) confirmation of the number of memory chips, (2) read of memory verification data, (3) read of correction program, (4) read of memory card characteristic information, (5) read of an alternative address table for defective sectors, and (6) read of a multiplexing sector address information.

Since the memory controller chip 1200 is manufactured in a versatile manner such that it is activated even if it is connected to any number of flash memory chips 1300, by the initialization (1), the number of flash memory chips 1300 connected to the memory controller chip 1200 must be confirmed and a non-volatile memory capacity that can be used by the SIM card 1100 must be grasped.

The SIM card 1100 is not activated correctly if the memory controller chip 1200 and the flash memory chip(s) 1300 are partially disconnected from each other or if the flash memory chip 1300 is not a correct chip. In order to prevent such a situation, the CPU 1201 must make verification about whether or not a connected state is not problematic, or whether or not the chip used is a correct chip in the initialization (2) by reading data in the flash memory chip 1300 written in advance during manufacture.

The SIM care 1100 may damage a user by erroneous operation if a program in the ROM 1203 has a defect. In order to prevent the damage, the CPU 1201 must read a correction program code for the memory controller from the flash memory chip 1300 and replace a defective portion of the program by the same in the initialization (3).

In the memory card function of the SIM card 1100, a capacity and attribute of a memory card, a table recording addresses of sectors that have been write-protected are characteristic information that should be accessed by the CPU 1201 instantaneously. Therefore, these characteristic information must be saved in the RAM 1204 that can be accessed at a high speed. Therefore, the CPU 1201 must read the characteristic information written in the flash memory chip 1300 in the initialization (4).

In the SIM card 1100, a defective sector is replaced by a correct sector so that a congenitally defective sector or a posteriori defect sector caused by repetition of erase is not accessed. The address of the alternative sector is information that should be accessed by the CPU 1201 instantaneously. Therefore, the information has to be saved in the RAM 1204 which can be accessed at a high speed. Therefore, the CPU 1201 must read a table on which the address of the alternative sector for the defective sector is recorded in the initialization (5).

In the SIM card 1100, unrelated stored data are multiplexed (reproduced) and protected to prevent the data from lost due to interruption of power supplying during data writing to the flash memory chip 1300. An address of a usable multiplexed sector is information that should be accessed by the CPU 1201 instantaneously. Therefore, the information has to be saved in the RAM 1204 that can be accessed at a high speed. Therefore, the CPU 1201 must read an address of the multiplexed sector in the initialization (6).

The completion of all the six initialization operations requires much time because it is necessary to read much data from the flash memory chip 1300. In order to indicate completion of all the initialization operations, an initialization register is present in the RAM 1204. The initialization register is put in a reset state (for example, a value is 0) from activation of the SIM card 1100 until the completion of the initialization operations. When the initialization operations have been completed, the CPU 1201 sets the initialization register (for example, the value is 1).

Figure 3:
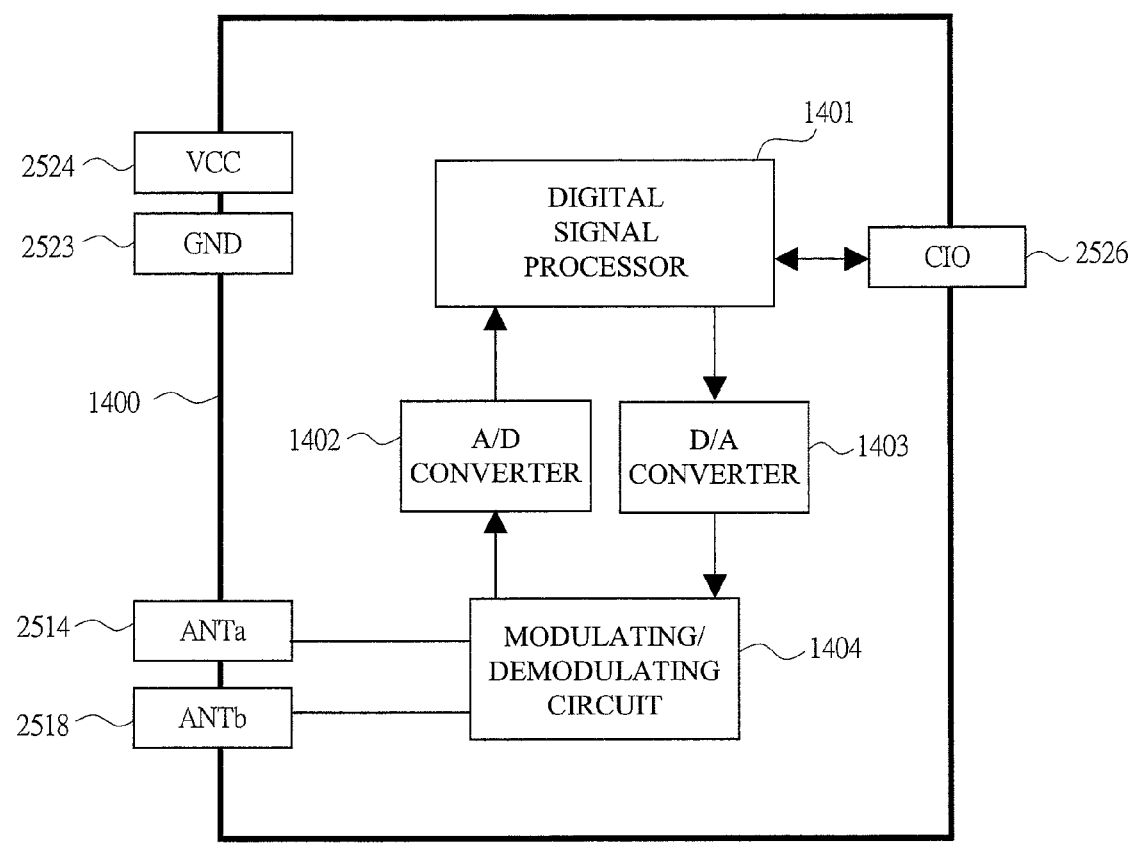
FIG. 3 is a diagram showing an internal configuration of an RF communication controller chip in the first embodiment of the present invention.

FIG. 3 is a diagram showing an internal configuration of the RF communication controller chip 1400.

The RF communication controller chip 1400 includes a GND terminal 2523 connected to the GND terminals 1515, 1503, and 1506, a VCC terminal 2524 connected to the VCC terminals 1511 and 1504, an ANTa terminal 2514 connected to the ANTa terminal 1514, and an ANTb terminal 2518 connected to the ANTb terminal 1518. The RF communication controller chip 1400 further includes a CIO terminal 2526 connected to the memory controller chip 1200. The RF communication controller chip 1400 is activated by power supplied through the VCC terminal 1511 (or 1504) and the GND terminal 1515 (or 1503 or 1506).

The RF communication controller chip 1400 is composed of a digital signal processor 1401, an A/D converter 1402, a D/A converter 1403, and a modulating/demodulating circuit 1404.

The modulating/demodulating circuit 1404 receives electric field change via a coil type antenna connected to the ANTa terminal 2514 and the ANTb terminal 2518 to perform demodulation and produce an analog signal. The A/D converter 1402 converts the analog signal to a digital signal. The digital signal processor 1401 generates a contactless IC card command from the digital signal according to a coding rule and outputs it to the CIO terminal 2526 as a serial signal that can be handled by the memory controller chip 1200.

The digital signal processor 1401 generates a digital signal according to a coding rule from a contactless IC card response received from the memory controller chip 1200 through the CIO terminal 2526 as the serial signal. The D/A converter 1403 converts the digital signal to an analog signal. The modulating/demodulating circuit 1404 modulates and transmits it via the coil type antenna connected to the ANTa terminal 2514 and the ANTb terminal 2518.

The memory controller chip 1200 performs reception of a contactless IC card command and transmission of a contactless 1C card response with the contactless communication reader/writer 1600 via the RF communication controller chip 1400. In these processings, the CPU 1201 interprets the contactless IC card command and processes the command according to a program stored in the ROM 1203 or the EEPROM 1207. These processings include a processing of reading data from the flash memory chip 1300 and a processing of writing data in the flash memory chip 1300. Prior to these read and write processings, as described above, initializations of the flash memory chip 1300 must be executed.

Figure 4:
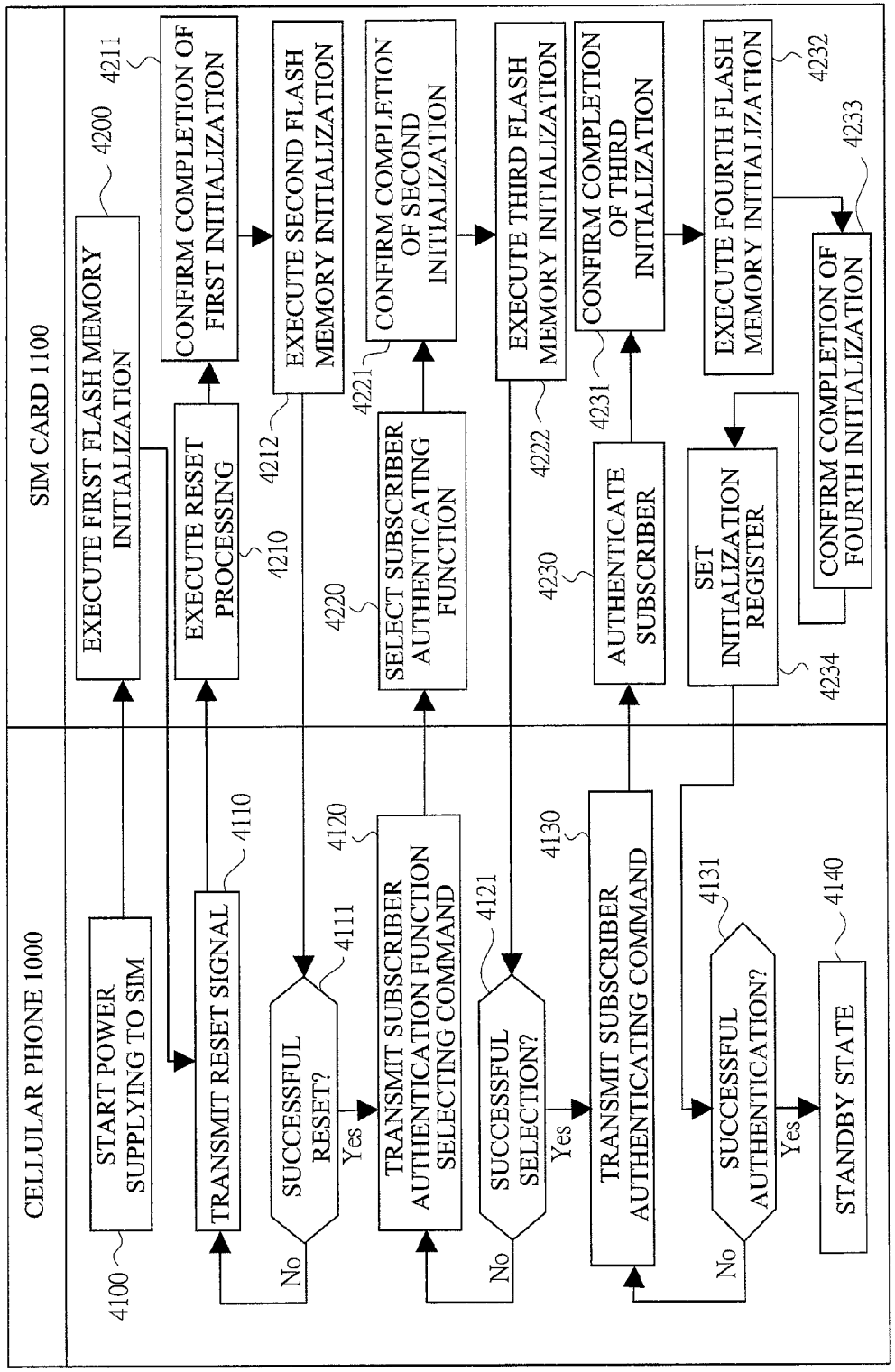
FIG. 4 is a flowchart showing a procedure for executing initialization of a flash memory chip in the first embodiment of the present invention.

FIG. 4 is a flowchart showing a procedure where the memory controller chip 1200 executes initialization of the flash memory chip 1300 before it executes read/write processing of the flash memory chip 1300 according to the contactless IC card command. In this flowchart, the initialization of the flash memory chip 1300 is partitioned to four stages of the first to fourth stages. The initialization operations (1) to (6) described above are contained in any of these four stages. For example, the first initialization includes the initialization (1), the second initialization includes the initializations (2) and (3), the third initialization includes the initialization (4), and the fourth initialization includes the initializations (5) and (6). Note that, regarding a relationship between each initialization stage and an initialization operation which should be included therein, another configuration for the relationship can be adopted and the relationship may be changed dynamically according to an inner state of the SIM card 1100.

An initialization procedure of the flash memory chip 1300 will be explained below.

The cellular phone 1000 starts power supplying to the SIM card 1100 immediately after it is activated (step 4100). Thereby, the memory controller chip 1200 in the SIM card 1100 starts an activation routine and the first flash memory initialization is executed among them (step 4200).

Thereafter, the cellular phone 1000 executes following three stage accesses to the SIM card 1100 in order to authenticate a subscriber to validate a communication function.

As the first access, the cellular phone 1000 transmits a reset signal to the RST terminal 1512 of the SIM card 1100 (step 4110). Thereby, the memory controller chip 1200 in the SIM card 1100 executes a reset processing (step 4210). After the completion of the first flash memory initialization is confirmed (step 4211), the second flash memory initialization is executed (step 4212). And, the SIM card 1100 transmits an ATR (Answer To Reset) byte to the cellular phone 1000 via the SIO terminal 1517. Thereby, the cellular phone 1000 determines whether or not reset has been executed successfully (step 4111). If it fails in the reset, the processing returns back to step 4110.

Next, as the second access, the cellular phone 1000 transmits a subscriber authentication function selecting command through the SIO terminal 1517 of the SIM card 1100 (step 4120). Thereby, the memory controller chip 1200 in the SIM card 1100 selects a subscriber authenticating function from the IC card functions supported thereby (step 4220). And, after the completion of the second flash memory initialization is confirmed (step 4221), the third flash memory initialization is executed (step 4222). The SIM card 1100 transmits a response indicating success of selection to the cellular phone 1000 through the SIO terminal 1517. Thereby, the cellular phone 1000 determines whether or not the cellular phone 1000 succeeds in selection (step 4121). If the cellular phone 1000 fails in selection, the processing returns back to step 4120. Note that, since the second flash memory initialization should be completed before the processing reaches step 4221, the processing from step 4111 to step 4221 and the second flash memory initialization can be executed in parallel. A time required for the whole flash memory initialization can be reduced by the parallelization.

Next, as the third access, the cellular phone 1000 transmits a subscriber authenticating command through the SIO terminal 1517 of the SIM card 1100 (step 4130). Thereby, the memory controller chip 1200 in the SIM card 1100 executes a subscriber authenticating function (step 4230). And, after the completion of the fourth flash memory initialization is confirmed (step 4231), the forth flash memory initialization is executed (step 4232). Then, the completion of the fourth flash memory initialization is confirmed (step 4233). By this, since all of the flash memory initializations have been completed, the CPU 1201 sets the initialization register (step 4234). And, the SIM card 1100 transmits a response indicating success of authentication to the cellular phone 1000 through the SIO terminal 1517. Thereby, the cellular phone 1000 determines whether or not the SIM card 1100 has succeeded in authentication (step 4131). If the SIM card 1100 has failed in authentication, the processing returns back to step 4130. Note that, since the third flash memory initialization should be completed before the processing reaches step 4231, the processing from step 4121 to step 4231 and the third flash memory initialization can be executed in parallel. A time required for the whole flash memory initialization can be reduced by the parallelization.

By processings mentioned above, the communication function of the cellular phone 1000 is validated so that the cellular phone 1000 is in communication standby state (step 4140).

Thus, the initialization of the flash memory chip 1300 in the SIM card 1100 can be executed in a series of routines executed in turning on the power of the cellular phone 1000. As a result, just when the SIM card 1100 conducts non-conduct communication with the contactless communication reader/writer 1600 via the cellular phone 1000, read/write processing to the flash memory chip 1300 is already available. When the read/write processing to the flash memory chip 1300 in response to a command received through the contactless IC card interface should be executed, the read/write processing can be executed instantaneously by simply confirming that the initialization register has been set. That is, the time required for executing the read/write processing is considerably reduced as compared with the conventional art. Furthermore, since power for performing the read/write processing to the flash memory chip 1300 is supplied from the power source 1800 of the cellular phone 1000, power supplying state is stable. As described above, according to the embodiment, in the SIM card 1100, accessing the flash memory according to a command received through the contactless IC card interface become easy and safe.

Second Embodiment

A second embodiment of the present invention will be explained below.

A SIM card 1100 and a cellular phone 1000 in the second embodiment have the same internal configuration, terminals, and functions as those in the first embodiment. This system including the SIM card 1100 and the cellular phone 1000 can executes initialization of a flash memory chip 1300 according to the procedure shown in FIG. 4 like the first embodiment. Note that, in the respective flash memory initialization operations shown as steps 4200, 4212, 4222, and 4232 in FIG. 4, data read form the flash memory chip 1300 is saved (cached) in an EEPROM 1207 in a memory controller chip 1200. And, when the initialization of the flash memory chip 1300 is executed according to the procedure shown in FIG. 4 again, cached data is read instead of reading data from the flash memory chip 1300. Note that, an access time of the CPU 1201 to the EEPROM 1207 is shorter than that of the CPU 1201 to the flash memory chip 1300. Thus, a time required for initialization of the flash memory can be reduced.

Third Embodiment

A third embodiment of the present invention will be explained below with reference to FIG. 5.

Figure 5:
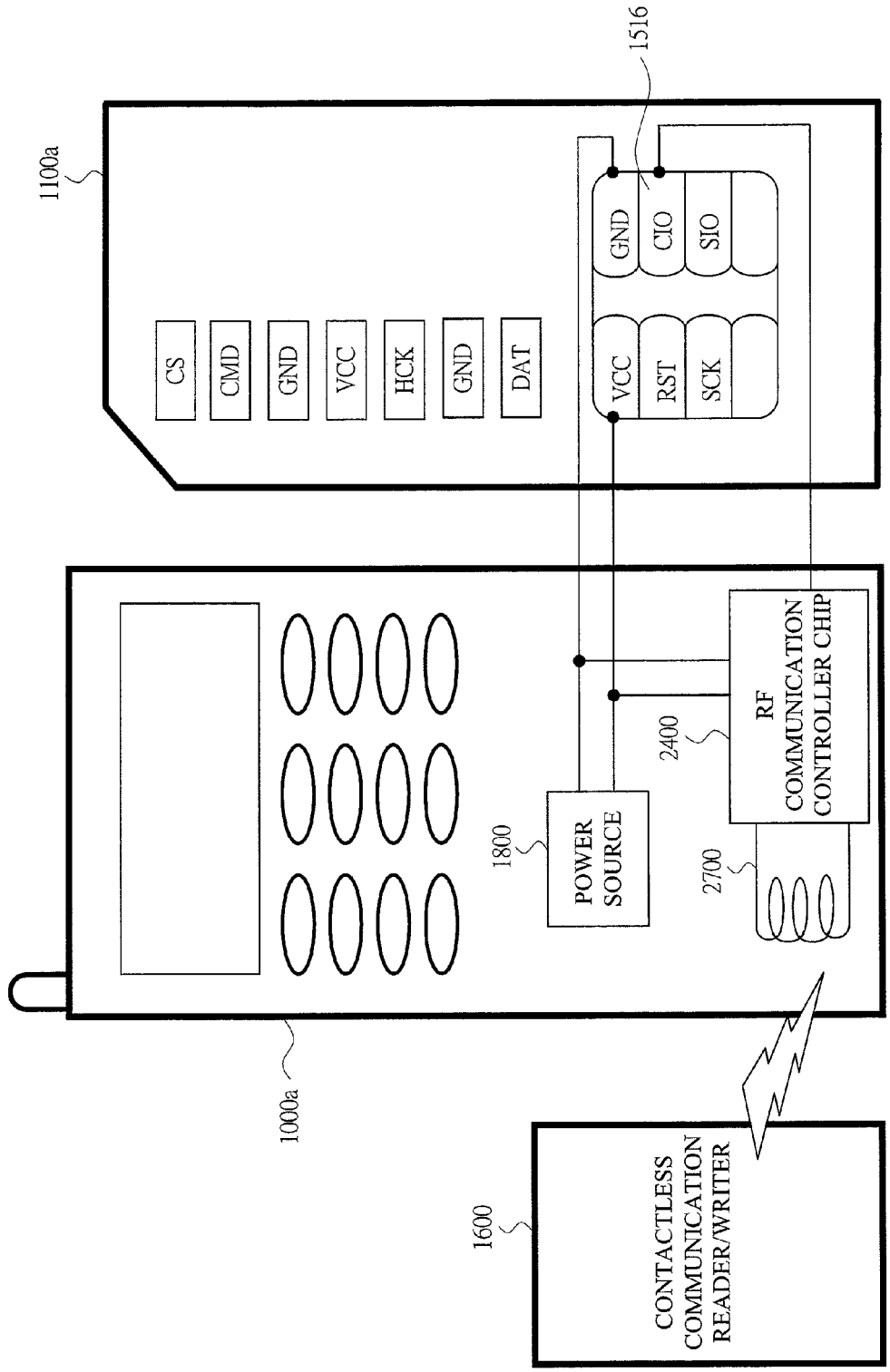
FIG. 5 is a diagram showing a whole system including a SIM card in a third embodiment of the present invention.

FIG. 5 briefly shows a whole system including an SIM card 1100a in the third embodiment.

A cellular phone 1000a includes a power source 1800, an RF communication controller chip 2400, and a coil type antenna 2700. The cellular phone 1000a also includes a communication module for a phone. Therefore, the RF communication controller chip 2400 is different from the communication module for a phone.

The SIM card 1100a has an internal configuration that the RF communication controller chip 1400 has been removed from the SIM card 1100 in the first embodiment, but it newly includes a CIO terminal 1516 as one of the contact IC card external terminals in the external terminal group 1500. The CIO terminal 1516 is connected to the CIO terminal 2516 of the memory controller chip 1200 in the SIM card 1100a.

The RF communication controller chip 2400 has the same internal configuration, terminals, and functions as those of the RF communication controller chip 1400 in the first embodiment, and it is activated by power supplied from the power source 1800. The RF communication controller chip 2400 is connected to the coil type antenna 2700 via its ANTa terminal and ANTb terminal. And, its CIO terminal is connected to the CIO terminal 1516 of the SIM card 1100a.

According to the configuration described above, the system including the SIM card 1100a and the cellular phone 1000a can execute "initialization of the flash memory" similar to that in the first embodiment and can achieve "reduction of the time required for initialization" similar to that in the second embodiment. Therefore, the third embodiment can obtain the effects of the invention shown in the first and second embodiments.

Fourth Embodiment

A fourth embodiment of the present invention will be explained below with reference to FIG. 6. A SIM card 1100a in the fourth embodiment has the same internal configuration as that of the SIM card 1100a in the third embodiment, and by proper controlling of power supplying to the flash memory 1300 conducted by the memory controller chip 1200, power consumption can be reduced.

A procedure where the SIM card 1100a executes initialization of the flash memory chip 1300 and a procedure where the SIM card 1100a executes read/write processing of the flash memory chip 1300 will be explained below. A flowchart obtained by linking the flowchart shown in FIG. 6 to step 4121 in the flowchart shown in FIG. 4 shows these procedures.

In the fourth embodiment, the initialization of the flash memory 1300 is executed basically according to the procedure explained in FIG. 4. However, after the memory controller chip 1200 sets the initialization register in order to indicate that all the initialization operation have been completed (4234), the power supplying to the flash memory 1300 is stopped (6000), then, a subscriber authentication result is transmitted to the cellular phone 1000. Thereafter, the cellular phone 1000 is put in a standby state for information exchange with the contactless communication reader/writer 1600 (4140). Since power consumption in the flash memory 1300 does not occur during this state, power saving of the SIM card 1100a is realized and saving in a power source battery for the cellular phone 1000 is achieved. Note that, as described above, control information that allows instantaneous read/write of data to the flash memory 1300 is saved in the RAM 1204 in the SIM card 1100a by completion of the initialization. Since power supplying to the memory controller chip 1200 is maintained even after step 6000, the information is prevented from being volatilized and lost.

After step 4140, when the coil type antennal 2700 of the cellular phone 1000 enters in a range where it can perform communication with the contactless communication reader/writer 1600, it receives a signal from the RF communication controller chip 2400 (6010). Then, data demodulated from the signal by the RF communication controller chip 2400 is transferred to the SIM card 1100a via the CIO terminal 1516 (6020). The memory controller chip 1200 restarts power supplying to the flash memory 1300 in response to reception of the data (6030). The initialization register is read to confirm the completion of the setting (6040) and reading/writing of data to the flash memory 1300 instantaneously executed using the control information or the like saved in the RAM 1204 (6050).

When information exchange between the cellular phone 1000 and the contactless communication reader/writer 1600 is terminated (or interrupted) and access to the flash memory 1300 is terminated, the memory controller chip 1200 stops power supplying to the flash memory 1300 (6060) and the cellular phone 1000 returns back to a standby state for information exchange with the contactless communication reader/writer 1600 (4140).

The data transferred at step 6020 can include information indicating whether read/write operation of data to the flash memory 1300 exists or not. The memory control chip 1200 determines whether power supplying to the flash memory 1300 should restarted or not according to the information. If read/write operation of data to the flash memory 1300 is not required, power supplying to the flash memory 1300 is kept stopped. Thereby, power consumption of the flash memory 1300 can be reduced.

Note that, stopping of power supplying to the flash memory 1300 by the memory controller chip 1200 can be executed at any time after all of initializations of the flash memory 1300 have been completed. FIG. 6 is one example of stopping of power supply in the case where the all of the initializations have been completed by completion of the fourth flash memory initialization, and another procedure can be executed. For example, in the case where the all of the initializations have been completed by completion of the first flash memory initialization, power supplying may be stopped just after step 4211. For example, in the case where the all of the initializations have been completed by completion of the second flash memory initialization, power supplying may be stopped just after step 4221. For example, in the case where the all of the initializations have been completed by completion of the third flash memory initialization, power supplying may be stopped just after step 4231.

Furthermore, a period of power supplying to the flash memory 1300 performed by the memory controller chip 1200 may be limited to respective execution times for the first to fourth flash memory initializations. That is, in each of the first to fourth flash memory initializations, power supplying starts just after its initialization start and the power supplying stops just after its initialization termination. For example, in the case where no initialization operation is executed in the second and third flash memory initializations, such a configuration can be adopted that power supplying stops just after step 4211 and power supplying starts just before step 4232. Power consumption of the flash memory 1300 that is not accessed during the period in which power supplying stopped can be reduced.

Fifth Embodiment

A fifth embodiment of the present invention will be explained below with reference to FIG. 7 and FIG. 8. A cellular phone 1000 in the fifth embodiment has a configuration that a short-range wireless communication module is attached to the cellular phone 1000 in the fourth embodiment. A SIM card 1100a in the fifth embodiment has the same internal configuration as that of the SIM card 1100a in the fourth embodiment.

The short-range wireless communication module is a Bluetooth module, for example. The Bluetooth is a communication standard for connecting mobile equipments such as notebook personal computers or cellular phones through short-range radio wave instead of a cable. By using the Bluetooth, various equipments can conduct data communication wirelessly. Different from a short-range communication technique using infrared called "IrDA (Infrared Data Association)", even if an obstacle is present, communication within 10 meters can be executed by using the Bluetooth. In the Bluetooth, spread spectrum communication of a frequency hopping system is used as a communication technique, and wave interference time is shortened by using 79 channels divided for each 1 MHz to perform frequency change 1600 times per second. Since the communication module is small and low power consumption, such a merit can be obtained that the Bluetooth can be mounted on the cellular phone easily. In a basic specification of the Bluetooth, the number of equipments simultaneously connected is 8, a frequency band used is 2.4 GHz (ISM band), a current consumption at sleep is 30 μA, a standby current consumption is 300 μA, and an asynchronous data transfer rate is 723.2 Kbps at a transmission and 57.6 Kbps at a reception.

The cellular phone 1000 in the fifth embodiment can perform communication with another short-range wireless communication module within a range of about 10 meters through the short-range wireless communication module. The cellular phone 1000 can obtain information about the contactless communication reader/writer 1600 spaced from the cellular phone 1000 by about 10 meters through the communication. The SIM card 1100*a* receives the information from the cellular phone 1000 to execute initialization of the flash memory 1300. Thereby, the initialization is completed before start of contactless communication, and read/write of data into the flash memory 1300 can be performed instantaneously in the contactless communication.

Figure 7:
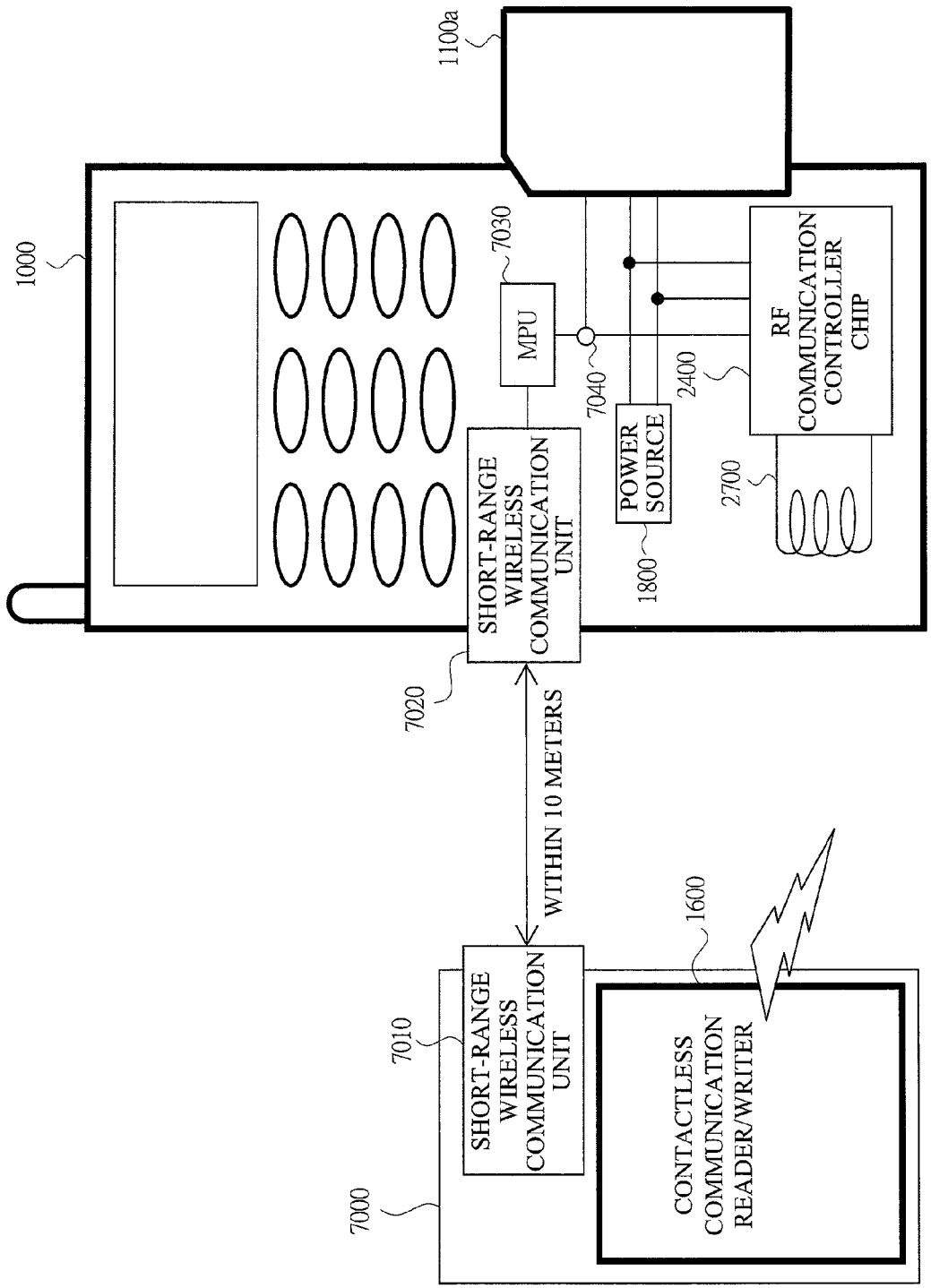
FIG. 7 is a diagram showing a whole system including a SIM card in a fifth embodiment of the present invention.

FIG. 7 briefly shows a whole system including the cellular phone 1000 in the fifth embodiment.

A gate machine 7000 includes the contactless communication reader/writer 1600 and a short-range wireless communication unit 7010. The gate machine 7000 is a ticket gate in a station house in a public transportation facility or the like, for example. The gate machine 7000 transmits data for notifying presence of itself including the contactless communication reader/writer 1600 to the cellular phone 1000 present within a range of about 10 meters using the short-range wireless communication unit 7010. The data includes the kind and the station name of the public transportation facility, for example.

The cellular phone 1000 includes a short-range wireless communication unit 7020, and it detects presence of the gate machine 7000 by reception of the data of the short-range wireless communication unit 7020. An MPU 7030 is a microprocessor controlling the whole cellular phone 1000, and it is connected to the short-range wireless communication unit 7020. A switch unit 7040 is a circuit to perform switching connection of the CIO terminal 1516 of the SIM card 1100*a* between the RF communication controller chip 2400 and the MPU 7030. The switching is controlled by the MPU 7030. Hereinafter, a state that the CIO terminal 1516 of the SIM card 1100*a* is connected to the RF communication controller chip 2400 is called "state A", while a state that it is connected to the MPU 7030 is called "state B". Especially, in the state B, the MPU 7030 serves as a pseudo RF communication controller chip 2400, and it can transmit a contactless IC card command to the SIM card 1100*a* and can receive a response to the command from the SIM card 1100*a*.

Figure 8:
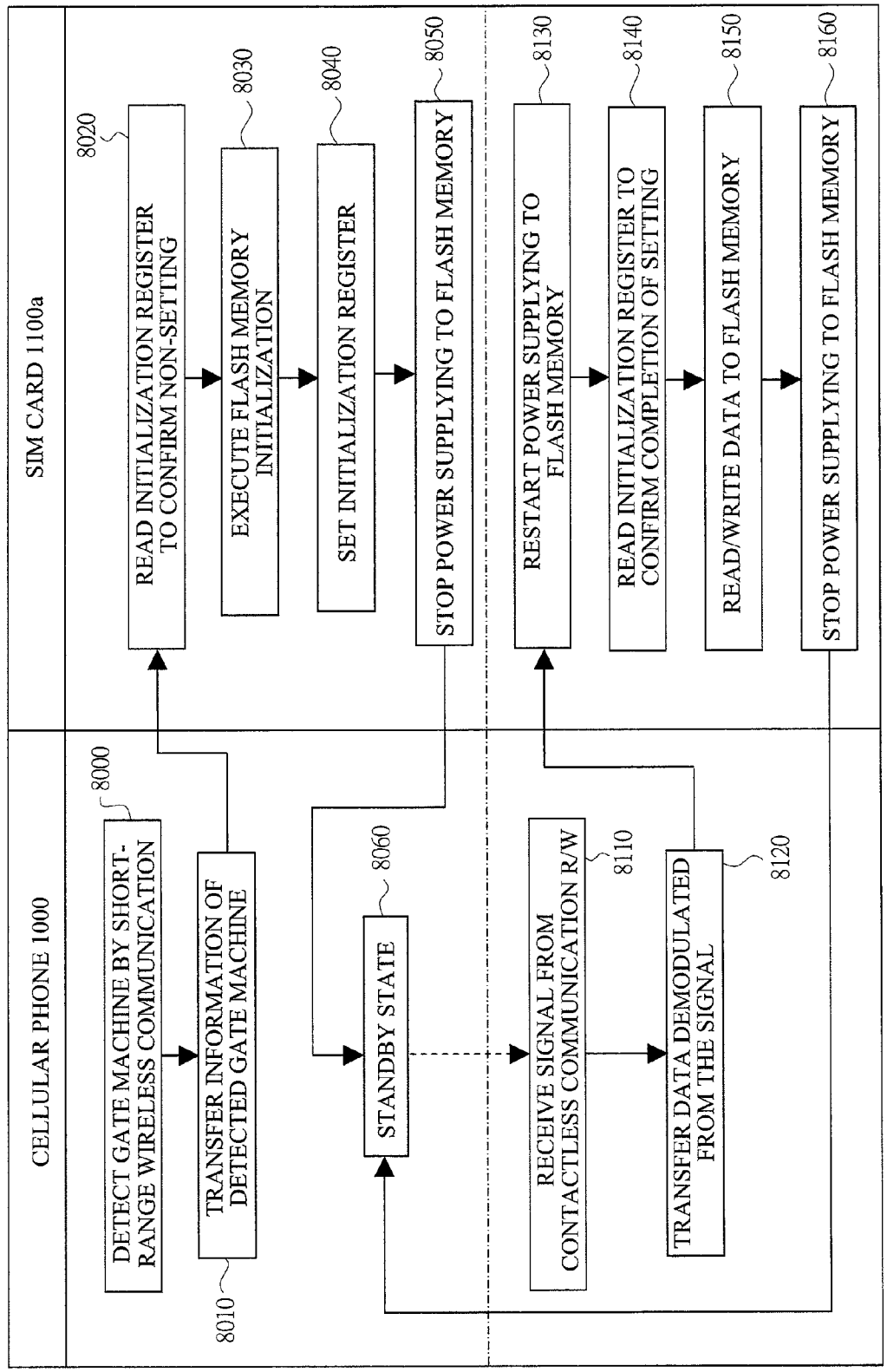
FIG. 8 is a flowchart showing a procedure for executing initialization of a flash memory chip in the fifth embodiment of the present invention.

FIG. 8 is a flowchart showing a procedure of executing initialization of the flash memory chip 1300 and a procedure of executing read/write processing of the flash memory chip 1300 performed by the SIM card 1100*a* in the fifth embodiment.

The MPU 7030 in the cellular phone 1000 detects the gate machine 7000 including the contactless communication reader/writer 1600 through the short-range wireless communication unit 7020 (8000). The MPU 7030 sets the switch unit 7040 to the state B and transmits a contactless IC card command to the SIM card 1100*a*. The command is for transferring information about the gate machine 7000 to the SIM card 1100*a* (8010). The SIM card 1100*a* receives the command to determine preliminary initialization of the flash memory chip 1300. Firstly, the SIM card 1100*a* reads the initialization register to confirm that the register has not been set yet (8020). Then, the SIM card 1100*a* executes the initialization operations of the flash memory chip 1300 described above (8030). When all the initialization operations are completed, the SIM card 1100*a* sets the initialization register (8040) and stops power supplying to the flash memory chip 1300 (8050). Thereafter, the SIM card 1100*a* returns a response to the command to the cellular phone 1000. Upon reception of the response, the MPU 7030 sets the switch unit 7040 to the state A and it is put in a standby state for information exchange with the contactless communication reader/writer 1600 (8060).

After step 8060, when the coil type antenna 2700 of the cellular phone 1000 enters in a range where it can perform communication with the contactless communication reader/writer 1600, a signal from the contactless communication reader/writer 1600 is received (8110). Then the data demodulated from the signal by the RF communication controller chip 2400 is transferred to the SIM card 1100*a* (8120). The memory controller chip 1200 restarts power supplying to the flash memory chip 1300 according to reception of the data (8130). Then, the initialization register is read to confirm that the register has been set (8140) and the operation of read/write of data to the flash memory chip 1300 is instantaneously executed (8150).

When information exchange between the cellular phone 1000 and the contactless communication reader/writer 1600 is terminated (or interrupted) and access to the flash memory 1300 is terminated, the memory controller chip 1200 stops power supplying to the flash memory 1300 (8160) and the cellular phone 1000 returns back to a standby state for information exchange with the contactless communication reader/writer 1600 (8060).

The data transferred at step 8120 can include information indicating whether there is read/write of data to the flash memory 1300 or not. The memory control chip 1200 determines whether power supplying to the flash memory 1300 is restarted or not based upon the information. If the read/write of data to the flash memory 1300 is not required, the power supplying to the flash memory 1300 is kept stopped. Thereby, the power consumption of the flash memory 1300 can be reduced.

Sixth Embodiment

Figure 9:
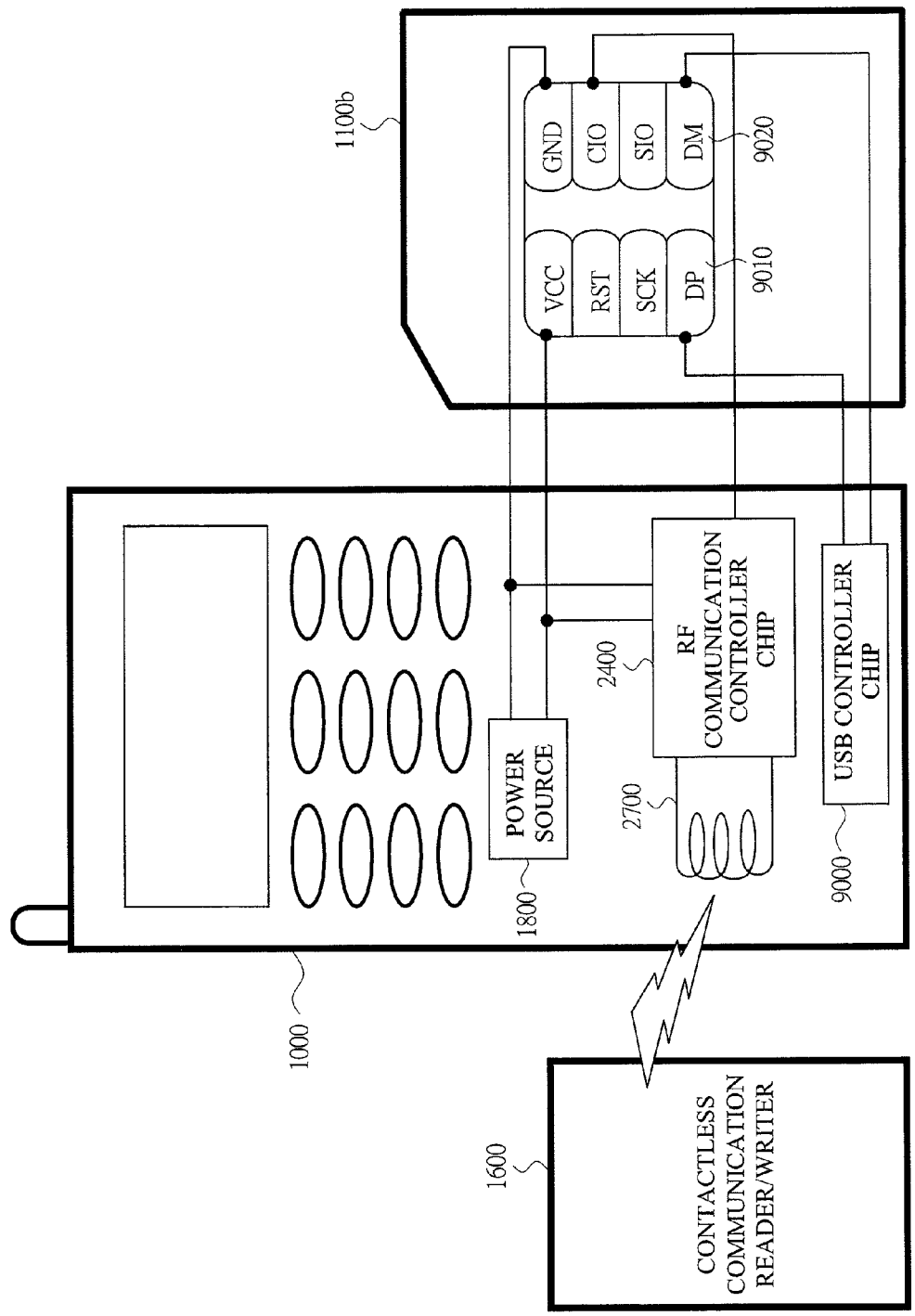
FIG. 9 is a diagram showing a whole system including a SIM card in a sixth embodiment of the present invention.

A sixth embodiment of the present invention will be explained below with reference to FIG. 9.

A SIM card 1100*b* in the sixth embodiment is configured so as to function as a USB device by adding a USB (Universal Serial Bus) interface to the SIM card 1100*a* in the fourth embodiment. External terminals DP9010 and DM9020 of the SIM card 1100*a* that are not used are allocated to a D+ terminal and a D− terminal of USB specification. Note that, a power source terminal VCC 1511 and GND 1515 of ISO7816 Standard are shared as power source terminals of the USB. The cellular phone 1000 includes a USB controller chip 9000, it is connected to the USB terminal group (1511, 1515, 9010, and 9020) of the SIM card 1100*b*, and it can exchange information with the SIM card 1100*b* according to a protocol conforming to the USB specification. At this time, the USB controller chip 9000 operates as a USB host and the SIM card 1100*b* operates as a USB device. Since the SIM card 1100*b* operates as the USB device, the memory controller chip 1200 in the SIM card 1100*b* has a required interface circuit and has a function of executing required arithmetic operations.

The SIM card 1100*b* has a function of various USB device classes according to a program stored in the ROM 1203 or the EEPROM 1207 in the memory controller chip 1200. The device class defines a standard function or protocol regarding various USB devices. For example, the device classes include mass storage class, chip card interface device (CCID) class, communication device class (CDC), audio class, human interface device (HID) class, and the like. The mass storage class of these classes is a standard specification for functioning as a removable storage such as a USB memory. The CCID class is a standard specification for functioning as a personal ID device such as an IC card and supports information exchange using APDU command/response of ISO7816 Standard. The CDC is a standard specification for functioning as a communication device such as a modem.

The SIM card 1100*b* in the sixth embodiment functions as at least the mass storage device and the CCID class device.

When the SIM card 1100*b* functions as the mass storage device, a recording medium for storage data is the flash memory chip 1300. On the other hand, when the SIM card 1100*b* functions as the CCID class device, it executes information exchange using the APDU command/response of ISO7816 Standard through the USB terminal group (1511, 1515, 9010, and 9020). The conventional SIM card including the SIM card 1100*b* can exchange information utilizing APDU command/response through a standard IC card terminal group, and it executes the subscriber authenticating function through the terminal group. The SIM card 1100*b* functions as the CCID class device to execute the subscriber authenticating function through the USB terminal group.

Figure 6:
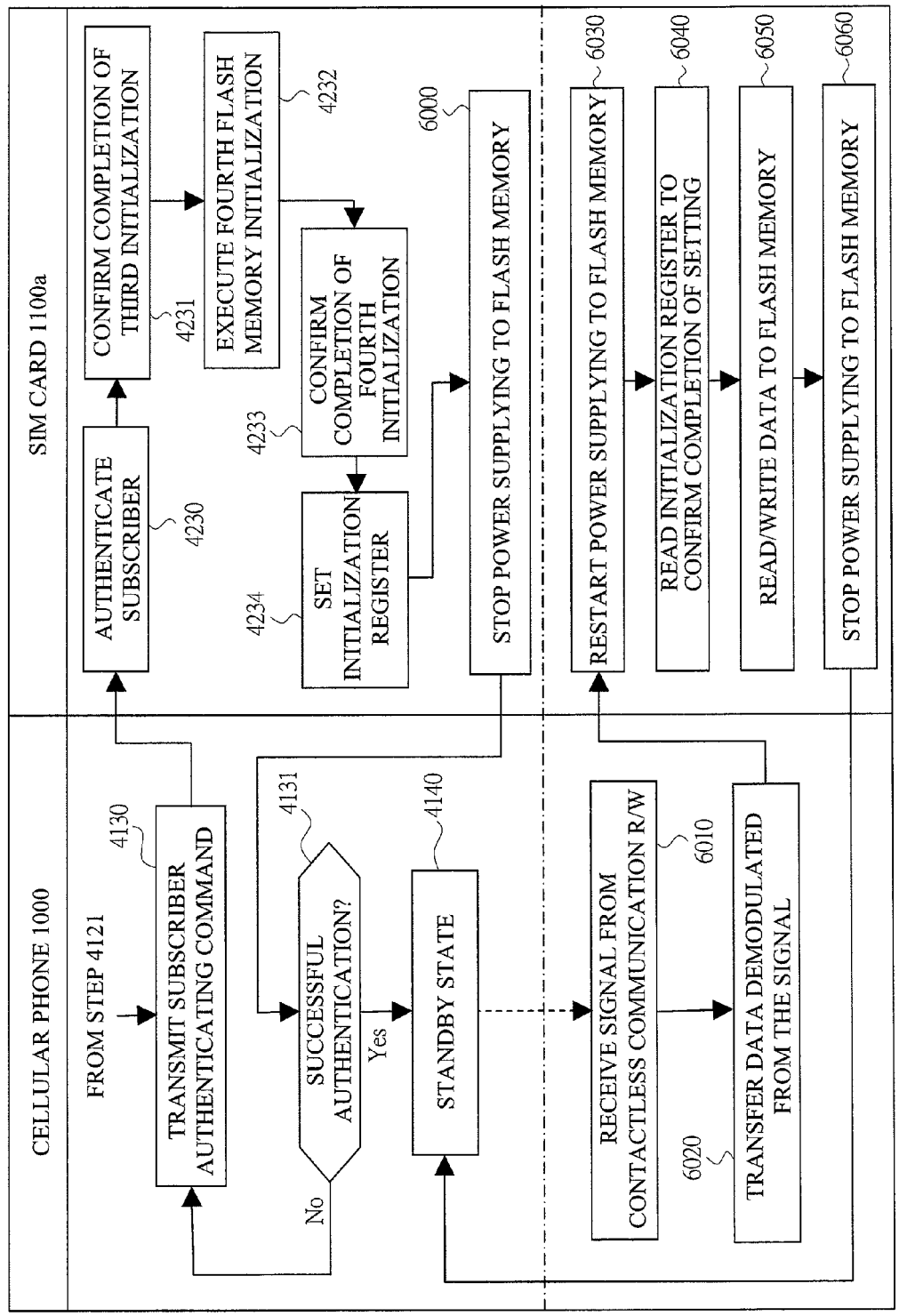
FIG. 6 is a flowchart showing a procedure for executing initialization of a flash memory in a fourth embodiment of the present invention.

The SIM card 1100*b* in the sixth embodiment executes initialization of the flash memory chip 1300 before contactless communication start upon reception of a signal from the USB terminal group according to a procedure similar to the flowchart shown in FIG. 4 and FIG. 6 even in execution of the subscriber authenticating function using the USB terminal group. Furthermore, power supplying to the flash memory chip 1300 is limited by such a method as described in the fourth embodiment. This embodiment obtains the effect of the present invention.

Note that, the SIM card 1100*b* executess initialization of the flash memory chip 1300 before contactless communication start upon reception of a signal from the USB terminal group even not only when the SIM card 1100*b* executes the subscriber authenticating function as the CCID class device but also when it executes another function as the CCID class device, and even when the SIM card 1100*b* functions as another USB device. Power supplying to the flash memory chip 1300 is limited by such a method as described in the fourth embodiment. This embodiment obtains the effect of the present invention.

The flash memory initializing processing described above is supplemented in view of a difference in kind and management method of a flash memory applied.

Generally, in the memory system including a flash memory as a recording medium, specific contents of initialization executed before read/write of data in the flash memory variously change according to the kind of a flash memory chip to be adopted for the memory system or according to how the memory controller in the memory system manages a physical allocated portion of a logic sector. In the present invention, it is possible to shorten a time conventionally required for initialization regardless of content of initialization to be executed. Especially, the initialization described in the first to sixth embodiment is one kind of initialization executed in the case where an AND type flash memory is adopted.

An ordinary memory managing method to the AND type flash memory is basically allocating a logic sector address and a physical sector address fixedly, and only if an allocated portion is a defective sector, allocation to another spare sector is performed. Since the logic sector address and the physical sector address can be mutually translated according to a simple calculation, it is unnecessary to additionally prepare a table for address translation or the like. Data rewrite procedures in this method are as follows:

(1) specify an erase unit block including data to be rewritten;
(2) read all data in the block to a buffer memory;
(3) save data in the buffer memory to a multiplexing sector with the same capacity as that of the block;
(4) rewrite data on the buffer memory
(5) erase the block;
(6) write data on the buffer memory to the potion corresponding to the block; and
(7) execute recovery using the saved data if power supplying is interrupted during writing.

Since a size of the erase unit block is small (several kilobytes) in the AND type flash memory, a capacity of a buffer memory to be prepared can be small, and such a write procedure is useful. However, since a size of the erase unit block is large (several hundreds kilobytes) in a NAND type flash memory, a large capacity of buffer memory is required for such a rewrite procedure, and such a write procedure is not applied generally. An ordinary memory managing method to the NAND type flash memory is basically allocating the logic sector address and the physical sector address dynamically. It is necessary to prepare a table for address translation or the like for mutual conversion between the logic sector address and the physical sector address. Data rewrite procedures in this method are as follows:

(1) select an erase unit block A including unwritten sector;
(2) write data to the unwritten sector of the block A and update the allocation address on the address conversion table;
(3) select an erase unit block B including much data invalidated by rewriting;
(4) write data (valid data) other than invalid data in the block B to the unwritten sector in the block A and update the allocated address on the address conversion table;
(5) erase the block B; and
(6) reuse the block B as the block A in the procedure (1).

Note that, in the procedure (2) or (4), simultaneously with writing data to a data region of the flash memory sector, the logic address is written in a redundant region thereof.

In the case where the NAND type flash memory is adopted in the SIM card of the present invention, it is generally necessary to prepare the above-mentioned address conversion table as one process of the initializing processing. This process is a processing of reading logic addresses written on the respective redundant regions over the whole physical sector in the flash memory chip and preparing a mapping table from the logic addresses to the physical addresses according to the logic addresses. The processing time increases in proportion to the capacity of the flash memory. In the case where the flash memory in the SIM card is increased in capacity, the effect of the initializing time reduction according to the present invention is large.

Next, in the first to sixth embodiments, a detailed specification of the contactless communication performed using the coil type antenna 1700 or 2700 is shown below.

The communication system is called "Proximity contactless communication" and the contactless communication is different from the phone communication of the cellular phone. The contactless communication is standardized by ISO/IEC. A communication-enabling distance of the contactless communication is within about 10 centimeters. A principle of the Proximity contactless communication will be explained. When a current is caused to flow in the coil type antenna on the side of the reader/writer 1600, an AC magnetic field is generated. If the coil type antenna 1700 or 2700 is entered in the magnetic field, an AC voltage is induced so that a current flows. Thereby, magnetic field (demagnetizing field) is generated and the coil type antenna on the side of the reader/writer 1600 is influenced by the field. Such interaction of the magnetic field constitutes a carrier between the cellular phone 1000 and the reader/writer 1600. Mutual signal transmission between the cellular phone 1000 and the reader/writer 1600 is achieved by changing amplitude, frequency, and phase of the carrier. As the Proximity contactless communication, there are three kinds of standard, Type A and Type B standardized by ISO/IEC 14443 Standard, and NFC (Near Field Communication) standardized by ISO/IEC 18092 Standard. The NFC is the most popular in the public transportation facilities in Japan, where a communication rate is 212 kbps and a digital data converting (coding) system is Manchester coding.

In the third to sixth embodiments, initialization can also be executed by reading data cached in the EEPROM 1207 instead of reading data from the flash memory chip 1300, as described in the second embodiment. Thereby, it is possible to reduce the time required for flash memory initialization.

Though the present invention that made by the present inventors has been specifically explained above based upon the embodiments, the present invention is not limited to the embodiments and it can be variously modified without departing from the gist of the present invention.

The present invention is available for an IC card such as a SIM card or a cellular phone loaded with the IC card.

What is claimed is:

1. An IC module comprising:
   a non-volatile memory chip;
   a controller chip for controlling the non-volatile memory chip;
   an interface for contact communication; and
   an interface for contactless communication,
   wherein the controller chip can authenticate a user of a host equipment,
   wherein the controller chip executes a processing of data transmitted through the interface for contactless communication using power supplied from the host equipment to the interface for contact communication,
   wherein the processing of data includes an operation of reading the data from the non-volatile memory chip by the controller chip and an operation of writing the data in the non-volatile memory chip by the controller chip, and
   wherein the controller chip executes initialization of the non-volatile memory chip between an activation of the host equipment and a completion of the authentication of the user indicated by the host equipment.

2. The IC module according to claim 1,
   wherein the controller chip executes initialization of the non-volatile memory chip within a predetermined time elapsing from start of power supplying from the host equipment to the interface for contact communication.

3. The IC module according to claim 1,
   wherein the controller chip executes initialization of the non-volatile memory chip within a predetermined time elapsing from inputting of a reset signal from the host equipment to the interface for contact communication.

4. The IC module according to claim 1,
   wherein the controller chip executes initialization of the non-volatile memory chip within a predetermined time elapsing from inputting of a command requesting execution of the authentication of a user from the host equipment to the interface for contact communication.

5. The IC module according to claim 1,
   wherein the controller chip executes initialization of the non-volatile memory chip within a predetermined time elapsing from inputting of a command executing the authentication of a user from the host equipment to the interface for contact communication.

6. The IC module according to claim 2,
   wherein the controller chip saves an execution result of the initialization of the non-volatile memory chip in an internal non-volatile memory in the controller chip, and when the initialization is executed again, the controller chip bypasses access to the non-volatile memory chip by referring to the execution result saved in the internal non-volatile memory.

7. The IC module according to claims 2,
   wherein the initialization includes at least one of confirmation of number of memory chips, read of memory validating data, read of a correction program, read of memory card characteristic information, read of an alternative address table for a defective sector, and read of a multiplexing sector address information.

8. A cellular phone including an IC module, an antenna, and a power source,
   wherein the IC module includes a non-volatile memory chip, a controller chip for controlling the non-volatile memory chip, an interface for contact communication, and an interface for contactless communication,
   wherein the controller chip can authenticate a user of the cellular phone,
   wherein the controller chip executes processing of data transmitted from the antenna through the interface for contactless communication using power supplied from the power source of the cellular phone to the interface for contact communication,
   wherein the processing of data includes an operation of reading the data from the non-volatile memory chip by the controller chip or an operation of writing the data in the non-volatile memory chip by the controller chip, and
   wherein the controller chip executes initialization of the non-volatile memory chip between an activation of the cellular phone and a completion of the authentication of the user indicated by the cellular phone.

9. The cellular phone according to claim 8,
   wherein the controller chip executes initialization of the non-volatile memory chip within a predetermined time elapsing from start of power supplying from the cellular phone to the interface for contact communication.

10. The cellular phone according to claim 8,
    wherein the controller chip executes initialization of the non-volatile memory chip within a predetermined time elapsing from inputting of a reset signal from the cellular phone to the interface for contact communication.

11. The cellular phone according to claim 8,
    wherein the controller chip executes initialization of the non-volatile memory chip within a predetermined time elapsing from inputting of a command requesting execution of the authentication of a user from the cellular phone to the interface for contact communication.

12. The cellular phone according to claim 8,
    wherein the controller chip executes initialization of the non-volatile memory chip within a predetermined time elapsing from inputting of a command executing the authentication of a user from the cellular phone to the interface for contact communication.

13. The cellular phone according to claim 9,
    wherein the controller chip saves an execution result of the initialization of the non-volatile memory chip in an internal non-volatile memory in the controller chip, and when the initialization is executed again, the controller chip bypasses access to the non-volatile memory chip by referring to the execution result saved in the internal non-volatile memory.

14. The cellular phone according to claim 9,
wherein the initialization includes at least one of confirmation of number of memory chips, read of memory validating data, read of a correction program, read of memory card characteristic information, read of an alternative address table for a defective sector, and read of a multiplexing sector address information.

15. An IC module that can perform communication with a cellular phone having an antenna and a signal converter for contactless communication different from phone communication through the signal converter, comprising:
 a non-volatile memory;
 an authenticating unit for authenticating a subscriber of the cellular phone; and
 a controller for controlling the non-volatile memory,
 wherein the controller writes data demodulated from a signal received in the contactless communication by the signal converter in the non-volatile memory, and
 wherein the controller reads data to be modulated to a transmission signal in the contactless communication by the signal converter from the non-volatile memory.

16. The IC module according to claim 15,
wherein the IC module is activated by power supplying from the cellular phone.

17. The IC module according to claim 16,
wherein the IC module executes initialization of the non-volatile memory corresponding to execution of an authenticating processing of the subscriber.

18. The IC module according to claim 17,
wherein the IC module sets a value indicating completion of the initialization in a register after execution of the initialization, and
wherein the IC module reads the value in the register and omits execution of the initialization at the contactless communication.

19. The IC module according to claim 17,
wherein the IC module stops power supplying to the non-volatile memory between completion of the initialization and start of the contactless communication.

20. The IC module according to claim 17,
wherein the initialization includes reading a plurality of logic addresses recorded in the non-volatile memory and preparing a table for converting the plurality of logic addresses to physical addresses corresponding thereto.

21. An IC module that can perform communication with a cellular phone having an antenna and a signal converter for contactless communication different from phone communication, and a short-range wireless communication unit through the signal converter, and that can be activated by power supplying from the cellular phone, comprising:
 a non-volatile memory;
 an authenticating unit for authenticating a subscriber of the cellular phone; and
 a controller for controlling the non-volatile memory,
 wherein the controller executes initialization of the non-volatile memory in response to detection of an apparatus that is a communication partner of the contactless communication by the short-range wireless communication unit,
 wherein the controller writes data demodulated from a signal received at the contactless communication by the signal converter to the non-volatile memory, and
 wherein the controller reads data to be modulated to a transmission signal at the contactless communication by the signal converter from the non-volatile memory.

22. The IC module according to claim 21,
wherein the IC module sets a value indicating completion of the initialization in a register after execution of the initialization, and
wherein the IC module reads the value in the register and omits execution of the initialization at the contactless communication.

23. The IC module according to claim 21,
wherein the IC module stops power supplying to the non-volatile memory between completion of the initialization and start of the contactless communication.

24. The IC module according to claim 21,
wherein the initialization includes reading a plurality of logic addresses recorded in the non-volatile memory and preparing a table for converting the plurality of logic addresses to physical addresses corresponding thereto.

25. An IC module that can perform communication with a cellular phone having an antenna and a signal converter for contactless communication different from phone communication, and a USB interface through the signal converter and the USB interface, and that can be activated by power supplying from the cellular phone, comprising:
 a non-volatile memory;
 an authenticating unit for authenticating a subscriber of the cellular phone; and
 a controller for controlling the non-volatile memory,
 wherein the controller executes initialization of the non-volatile memory in response to reception of a signal from the USB interface,
 wherein the controller writes data demodulated from a signal received at the contactless communication by the signal converter to the non-volatile memory, and
 wherein the controller reads data to be modulated to a transmission signal at the contactless communication by the signal converter from the non-volatile memory.

26. The IC module according to claim 25,
wherein the IC module sets a value indicating completion of the initialization in a register after execution of the initialization, and
wherein the IC module reads the value in the register and omits execution of the initialization at the contactless communication.

27. The IC module according to claim 25,
wherein the IC module stops power supplying to the non-volatile memory between completion of the initialization and start of the contactless communication.

28. The IC module according to claim 25,
wherein the initialization includes reading a plurality of logic addresses recorded in the non-volatile memory and preparing a table for converting the plurality of logic addresses to physical addresses corresponding thereto.

* * * * *